(12) United States Patent  
Köpfer (10) Patent No.: US 11,073,675 B2  
(45) Date of Patent: Jul. 27, 2021

(54) CAMERA MODULE AUTOFOCUS ACTUATOR

(71) Applicant: ACTUATOR SOLUTIONS GMBH, Gunzenhausen (DE)

(72) Inventor: Markus Köpfer, Stoedtlen-Regelsweiler (DE)

(73) Assignee: ACTUATOR SOLUTIONS GMBH, Gunzenhausen (DE)

( * ) Notice: Subject to any disclaimer, the term of this patent is extended or adjusted under 35 U.S.C. 154(b) by 93 days.

(21) Appl. No.: 16/607,152

(22) PCT Filed: Apr. 20, 2018

(86) PCT No.: PCT/IB2018/052773  
§ 371 (c)(1),  
(2) Date: Oct. 22, 2019

(87) PCT Pub. No.: WO2018/203173  
PCT Pub. Date: Nov. 8, 2018

(65) Prior Publication Data  
US 2020/0041872 A1 Feb. 6, 2020

(30) Foreign Application Priority Data  
May 4, 2017 (IT) .......................... 102017000048138

(51) Int. Cl.  
*G02B 7/02* (2021.01)  
*G02B 7/09* (2021.01)  
(Continued)

(52) U.S. Cl.  
CPC ................. *G02B 7/02* (2013.01); *G02B 7/09* (2013.01); *F03G 7/065* (2013.01); *G03B 13/36* (2013.01)

(58) Field of Classification Search  
None  
See application file for complete search history.

(56) References Cited

U.S. PATENT DOCUMENTS 8,073,320 B2 * 12/2011 Topliss .................. G02B 7/005  
396/133  
8,350,959 B2 * 1/2013 Topliss .................. G03B 13/34  
348/374  
(Continued)

FOREIGN PATENT DOCUMENTS

EP 2 003 489 A2 12/2008  
JP 2008-20813 A 1/2008  
(Continued)

OTHER PUBLICATIONS

International Search Report, issued in PCT/IB2018/052773, dated Aug. 20, 2018.

(Continued)

*Primary Examiner* — William R Alexander  
*Assistant Examiner* — Tamara Y. Washington  
(74) *Attorney, Agent, or Firm* — Birch, Stewart, Kolasch & Birch, LLP (57) ABSTRACT

Camera module autofocus actuator comprising a movable lens carrier, one or more shape memory alloy wires, a first return elastic element, a second return elastic element substantially identical to the and symmetric to the first return elastic element, wherein one end of the one or more shape memory alloy is mounted to the first return elastic element and the other end to another return elastic element.

20 Claims, 5 Drawing Sheets (51) Int. Cl.
G03B 13/36 (2021.01)
F03G 7/06 (2006.01)

(56) References Cited

U.S. PATENT DOCUMENTS

2009/0128064 A1   5/2009   Yang
2011/0091193 A1   4/2011   Lim et al.

FOREIGN PATENT DOCUMENTS

JP          5304896 B2    10/2013
KR    10-2011-0097555 A    8/2011
WO    WO 2008/117958 A1   10/2008

OTHER PUBLICATIONS

Written Opinion of the International Preliminary Examining Authority, issued in PCT/IB2018/052773, dated Apr. 24, 2019.
Written Opinion of the International Searching Authority, issued in PCT/IB2018/052773, dated Aug. 20, 2018.

* cited by examiner

CAMERA MODULE AUTOFOCUS ACTUATOR

The present invention is inherent to a novel and improved autofocus (AF) actuator for camera modules incorporating one or more shape memory alloy wires as actuating element(s), with particular reference to cellular phones camera modules.

Generally speaking the use of shape memory alloy wires as actuating elements provides various advantages with respect to other actuating systems in terms of weight, power consumption, costs.

These advantages have already been recognized also in the field of camera modules and have been the subject of various patent applications, such as international patent applications WO 2007/113478, WO 2011/122438 and U.S. Pat. No. 8,159,762 all describing camera modules with a shape memory alloy wire in contact with the lens carrier (sometimes referred in the field as lens barrel) and fixed to the camera module housing or support member. The controlled heating via Joule effect of the shape memory alloy wire causes its contraction and consequently the movement of the lens carrier with respect to the housing, because the lengths of SMA wire apply a tensional force having a component along the optical axis.

As the fractional change in length, in the order of 2-8%, of the SMA wire is limited by the physical properties of the SMA material itself, if the SMA wire were arranged parallel to the movement direction it would be difficult to achieve a sufficient degree of movement for the lens carrier. Although in theory any degree of movement could be achieved by using a wire of sufficient length, this would imply an unacceptable increase in the size of the actuation apparatus.

However, by arranging lengths of SMA wire at acute angles to the optical axis, the degree of movement along the optical axis for a given change in length of the SMA wire is increased. This is because the angled orientation of the SMA wire effectively provides gearing, as the change in length of the SMA wire causes the orientation of the SMA wire to change so that the degree of movement along the optical axis is greater than the actual change in length of the wire resolved along the optical axis.

EP 1999507, for example, is concerned with maximizing the degree of movement of the lens carrier along the optical axis within the practical constraint of the limited size of the actuation apparatus. The solution proposed therein is the use of two lengths of SMA wire in a pair coupled to one of the lens carrier and the support member at a common point and extending therefrom at acute angles relative to the optical axis of opposite sign as viewed radially of the optical axis.

The acute angle of the wires provides the gearing effect described which increases the degree of movement as compared to wires extending along the optical axis. However, arranging lengths of SMA wire at an acute angle to the optical axis provides the disadvantage that the SMA wire also provides off-axis forces with a component perpendicular to the optical axis that tend to laterally displace or tilt the lens carrier.

Such off-axis forces can be resisted by the design of the suspension system that supports the lens carrier on the support member and guides its movement along the optical axis, however such a suspension system tends to have high frictional forces and is not compact. For example, one type of such a suspension system is a bearing in which a movable bearing element contacts and runs along a track, with the off-axis resistance provided by the reaction between the bearing element and the track, but a bearing is a type of suspension system having relatively high frictional forces and being of relatively large size.

The two above-referenced international patent applications do not address the frictional phenomena between housing and lens carrier and the related problems in terms of actuator lifetime, while this aspect is instead tagged in U.S. Pat. No. 8,159,762 by means of rolling members interposed between the housing and the lens carrier and a return force with a component perpendicular to the optical axis to ensure the contact between the rolling members and the lens carrier. In addition to the bulkiness problems mentioned above, this significant and constant perpendicular component causes itself a stress on the structure, and in frequently used actuating systems, such as in a camera module AF, it may lead to premature failures or to compensate by using upgraded components, for example by using wires bigger than required.

Another drawback is associated to the manufacturing of such mechanical structures, which requires the making and reciprocal coupling of several elements with a precise positioning of the rolling members. This makes the actuator more expensive to manufacture and less reliable since there are many parts that need to properly work together in cooperation, and a problem with any of them may affect the performance of the actuator or even cause the failure thereof.

An alternative arrangement is disclosed in WO 2008/117958 showing an AF camera module including a base with a cylindrical member extending therefrom that is provided with two opposite slits formed in the wall of the cylindrical member and extending parallel to the optical axis of a lens carrier slidably mounted within the cylindrical member. Two supporting bars protrude outward from an upper end of the cylindrical member at portions above the slits, and a hook bar protrudes from the outer circumference of the cylindrical member midway between the slits. Protrusions are formed on an outer circumference of the lens carrier to extend out of the cylindrical member through the slits, and springs formed of conductive material are respectively installed on outer end portions of the protrusions with their lower ends fixed on a top surface of the base and their upper ends fixed to the protrusions.

In addition, a first and a second end of a SMA wire are respectively connected to the protrusions and electrically connected to the springs such that when electric power is applied to the springs, current flows along the SMA wire which gets shorter. The SMA wire extends from the first end fixed on one of the protrusions to the supporting bar above it, and is bent downward at said supporting bar to extend down to the hook bar around which it is bent upward to extend up to the other opposite supporting bar, where it is again bent downward to extend down to the other protrusion such that the second end of the SMA wire is fixed to said protrusion.

Therefore, when the current is applied to the SMA wire and thus its length is reduced, the protrusions move upward along the slits and therefore the lens carrier moves upward. In this state, when the current applied to the SMA wire is cut off, the protrusions are moved downward by the restoration force of the springs and therefore the lens carrier is moved downward.

In this arrangement, the SMA wire does not provide off-axis forces with a component perpendicular to the optical axis since such forces are discharged onto the supporting bars and the hook bar that are integral with the base, however the tortuous path of the SMA wire with three bends around said bars negatively affects the reliability and effectiveness of the camera module due to the concentrations of stress and friction at those bending positions.

Another alternative arrangement aimed to increase the distance over which the lens carrier can be displaced along the optical axis can be found in the Japanese patent 5304896 that describes a solution using two symmetrical SMA wires secured between common electrodes located on the support member at opposite positions with respect to the optical axis, the two SMA wires forming a square ring in a plane perpendicular to the optical axis. In their non-activated condition the SMA wires have an arched or deflected configuration in a plane comprising the optical axis, and then they reach a flattened (i.e. perpendicular to the optical axis) configuration only upon actuation, thus raising the lens carrier that is connected to the central portions of said SMA wires. The return movement of the lens carrier, upon deactivation of the SMA wires, is provided by elastically deformable members that connect the lens carrier to the support member.

Also in this solution, the SMA wires connect the support member to the lens carrier and follow a path, in a plane perpendicular to the optical axis, with a 90° bend in the middle portion that implies a stress concentration.

EP 2003489 discloses a somewhat similar AF mechanism including a base plate and a top plate with a lens carrier movable therebetween that is biased by a top spring towards the base plate, and with a drive arm having a pantograph structure that holds the lens carrier. A single SMA wire is formed like a square ring and is extended on two displacement input sections of the drive arm, located at first two opposite corners of said square ring, and around a tension guide mounted between the top and bottom plates at a third corner opposite to the fourth corner where both ends of the SMA wire are fixed, through two SMA fixing members serving also as electrodes, onto a support member mounted on the bottom plate.

When an electric current is applied to the SMA wire such that its length is reduced, this force of reduction acts on the two displacement input sections and is converted into a compression force for compressing the drive arm, since the tension guide and the electrodes at the other two opposite corners cannot be moved, such that the drive arm pushes the lens upwardly in the direction of the optical axis against the biasing force of the top spring. Obviously, upon deactivation of the SMA wire, the lens carrier is pushed back down towards the base plate by the top spring.

Therefore, even in this solution the SMA wire connects the support member (base plate) to the lens carrier (through the drive arm) and follows a path, in a plane perpendicular to the optical axis, with a 90° bend in the middle portion (at the tension guide) that implies a stress concentration.

The object of the present invention is therefore to overcome the drawbacks still present in the prior art in terms of cost, complexity, reliability, stress concentration and frictional forces in a SMA-based autofocus, while providing a compact structure which maximizes the movement of the lens carrier.

This object is achieved by means of a camera module autofocus actuator having the features recited in claim 1.

The term "substantially" in the present specification indicates the fact that there may be minimal variations, such as standard manufacturing tolerances that are typically less than 5%, which can involve constitutional parameters such as width, length, thickness, diameter and so on.

A first important advantage of the structure of this actuator is that it permits to fully exploit and amplify the length change of the activated SMA wire(s) without substantially generating unbalanced off-axis forces that stress the structure and cause high friction during the movements, whereby prior art rolling members can be dispensed with.

A second significant advantage resides in the fact that the SMA wire(s) do not bend around unyielding members that cause a stress concentration in the wire(s) upon activation thereof, thus increasing the reliability and operational life of the actuator.

A third advantage is that the structure of such an actuator is simpler and therefore cheaper to manufacture, with fewer and more robust components that provide greater reliability.

Still another advantage results also from a careful selection of the materials for the lens carrier and the support member, which materials guarantee a smooth sliding of the lens carrier on the support member with low friction, low particle generation, low stick slip, high resistance for drop test and a tight static and dynamic tilt tolerance.

These and other advantages and features of the AF actuator according to the present invention will become apparent to those skilled in the art from the following detailed description of various embodiments thereof with reference to the accompanying drawings in which:

In the above figures the dimensions and dimensional ratio of the elements may not be correct and in some cases, such as for example with regards to the shape memory alloy wire diameter, have been altered in order to enhance the drawing comprehension.

Figure 1A:
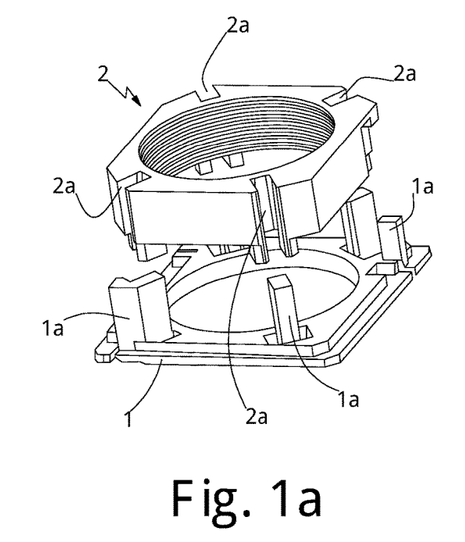
FIGS. 1a and 1b are top perspective views of two possible arrangements for the sliding coupling of the support member and lens carrier of an AF actuator according to the present invention.
Figure 1B:
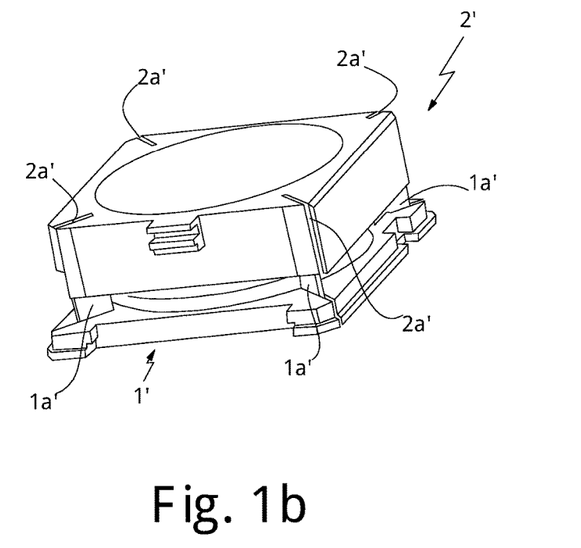

The perspective views of FIGS. 1a and 1b show, in an exploded condition and an assembled condition respectively, two possible arrangements for the sliding coupling of a fixed support member 1, 1' and a movable lens carrier 2, 2' that is supported and guided by said support member 1, 1' to perform a reciprocating motion along an optical axis of the AF actuator.

In general, the fixed support member 1, 1' and the movable lens carrier 2, 2' are made of plastic material, have a substantially square shape in a plane orthogonal to the optical axis and are slidingly coupled through at least four guide posts 1a, 1a' that extend parallel to the optical axis from the support member 1, 1' and engage matching grooves 2a, 2a' formed on the lens carrier 2, 2'. The post/groove couplings are preferably formed at the corners of the actuator so as to minimize the size thereof, but they could also be located elsewhere in case of particular necessity. For example, the actuator could have a rectangular shape if double optics are used, and additional couplings could be provided on the long sides between the two sets of lenses.

The fixed support member 1, 1' and the movable lens carrier 2, 2' are injection molded with high precision molds and with a careful selection of the plastic materials (as to resistance, sliding factor and stability over temperature) in order to achieve dimensional tolerances that guarantee a maximum tilt of 0.08° of the lens carrier when coupled to the support member. The difference between the two arrangements shown in FIGS. 1a, 1b is that in the first case the guide posts 1a are integrally molded on the support member, and therefore are made of plastic, whereas in the second case the guide posts 1a' are metal plates pressed in on the support member 1', such metal plates being stable over temperature and offering the best sliding factor.

FIGS. 2a-2b, 3a-3b, 5a-5b and 7a-7b show four different embodiments of the present actuator with the sliding coupling between the support member 1 and the lens carrier 2 according to FIG. 1a, yet it is clear that similar embodiments can be obtained with the sliding coupling between the support member 1' and the lens carrier 2' according to FIG. 1b.

The plastic materials are selected to provide the above-mentioned advantages of low friction, low particle generation, low stick slip and high resistance for drop test, thus helping in dispensing with the rolling members arranged between the support member and the lens carrier that are present in the cited prior art actuators. The applicant found that a good combination of materials is for the support member to be made from polybutylene terephthalate (e.g. Celanex 2002-2 from Celanese Corporation of Irving, Tex., US) and for the lens carrier to be made from copolymer polyoxymethylene (e.g. Hostaform C 27021 also from Celanese Corporation).

Figure 2A:
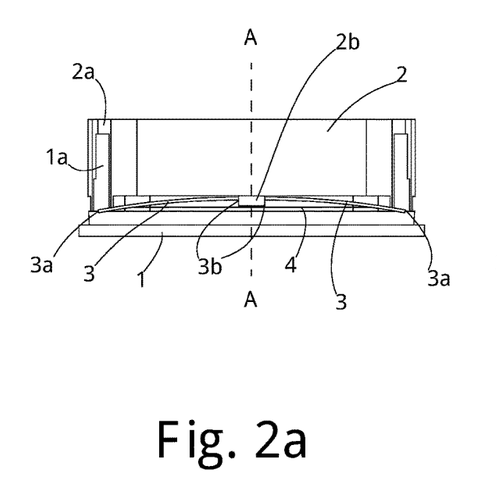
FIGS. 2a and 2b are front views of a first embodiment of the AF actuator with the SMA wires in the non-activated and activated conditions respectively.
Figure 2B:
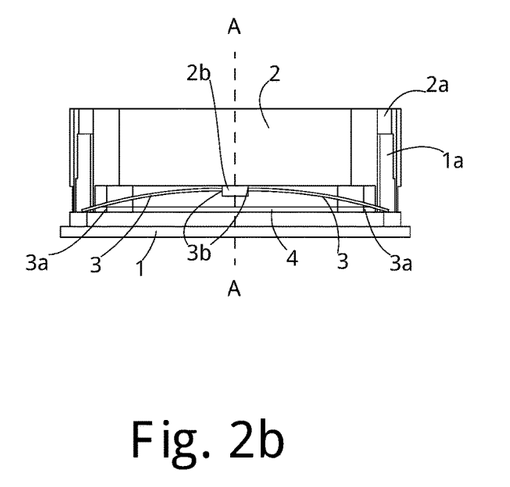

The first embodiment illustrated in FIGS. 2a, 2b of an actuator according to the present invention includes four identical return elastic elements 3 arranged in two pairs with the two elements 3 of each pair being contained in a common plane parallel to the optical axis A, with symmetrically opposite mounting arrangements with respect to the optical axis A, and two straight shape memory alloy wires 4 each of which is mounted, preferably horizontally, between the two elements 3 of a same pair. The front views of these figures shown only one pair of return elastic elements 3 with a relevant shape memory alloy wire 4, but the same arrangement is found also on the opposite side of the actuator.

Each return elastic element 3 includes a flexible strip, preferably made of metal, mounted with a first end 3a secured to the support member 1 at a lower outermost position and a second end 3b secured to the lens carrier 2 at a higher innermost position. More specifically, the first end 3a is slidingly mounted on the support member 1 whereas the second end 3b is anchored to the lens carrier 2 at a central socket 2b located along the bottom edge thereof.

In the rest condition of FIG. 2a the actuator is in the so-called infinity focus position and when the shape memory alloy wires 4 are heated by current passage they shorten and exert a force onto the lens carrier 2 through elements 3 that are pulled closer to each other, thus moving upwards the lens carrier 2 through socket 2b such that the lens is focused up to the so-called macro position (i.e. focusing on a nearby plane) of FIG. 2b. Infinity and macro represent the two AF extreme positions and therefore correspond to the amount of adjustment that the AF actuator shall be capable to achieve.

When the current supply stops, the same return elastic elements 3 exerting a vertical return force opposing the SMA traction pull back the lens carrier 2 to the infinity position. It is important to underline that with such an AF actuator configuration according to the present invention the return elastic elements 3 exert a force only in parallel to the optical axis so as to prevent any off-axis force from being generated.

A position sensor and readout, for example a magnet on the lens carrier 2 and a Hall sensor on the support member 1, are also present to determine the correct equilibrium position during the AF actuator operation so that a control unit, e.g. a flexible printed circuit board, can provide current to the SMA wires 4 through their terminals for their activation via Joule effect according to the Hall sensor readout.

Furthermore, it should be noted that although the SMA wires 4 are shown connected to the return elastic elements 3 at a position close to their outermost first ends 3a, wires 4 could also be arranged at a higher position closer to the middle of elements 3 which could be fixed to the support member 1 (i.e. the first ends 3a would not be slidingly mounted thereon) such that the vertical displacement of the lens carrier 2 would result only from the deformation of the central portions of elements 3 included between the ends of wire 4.

Figure 3A:
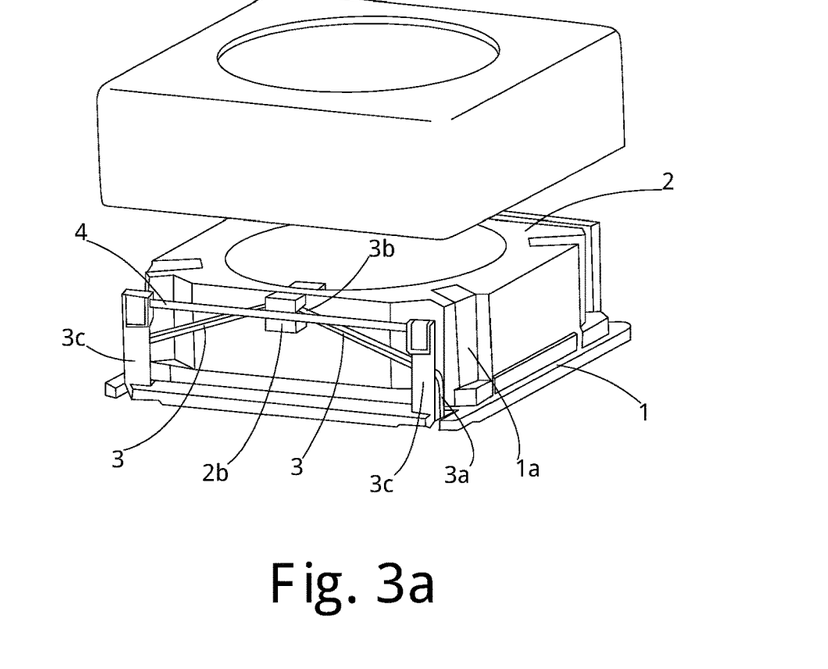
FIGS. 3a and 3b are top perspective views of a second embodiment of the AF actuator with the SMA wires in the non-activated and activated conditions respectively.
Figure 3B:
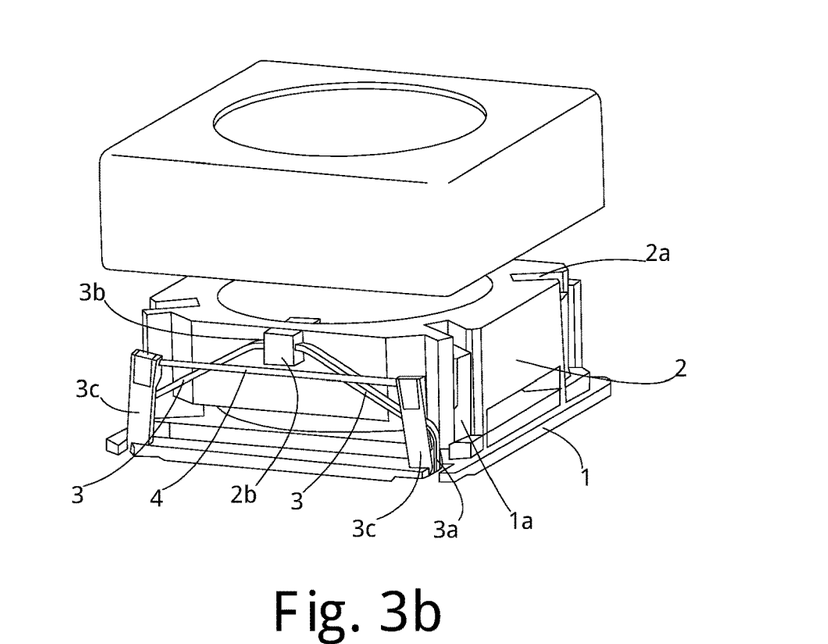

A variant of such an arrangement is shown in the second embodiment illustrated in FIGS. 3a, 3b where the first ends 3a do not slide on the support member 1 but are able to pivot inwards. More specifically, in this embodiment the return elastic elements 3 are mounted much more slanted since the second end 3b of each element 3 is anchored to the lens carrier 2 at a central socket 2b that is located along the top edge thereof. Moreover, each return elastic element 3 further includes an upright 3c extending substantially vertically from the mounting position of the first end 3a up to at least the height at which the mounting position of the second end 3b is located when the shape memory alloy wire 4 is not activated, the latter being mounted between said uprights 3c substantially at said height (i.e. wire 4 is horizontally aligned with the second ends 3b in FIG. 3a).

The operation of this second embodiment is substantially the same as in the first embodiment, i.e. when the shape memory alloy wires 4 are heated by current passage they shorten and pull closer to each other the uprights 3c which pivot inwards thus causing also the first ends 3a to pivot inwards and move closer so as to exert a force onto the lens carrier 2 that is moved upwards through socket 2b (FIG. 3b). Upon deactivation of the SMA wires 4, the return elastic elements 3 pull back the lens carrier 2 to the rest position of FIG. 3a.

Figures 4A, 4B:
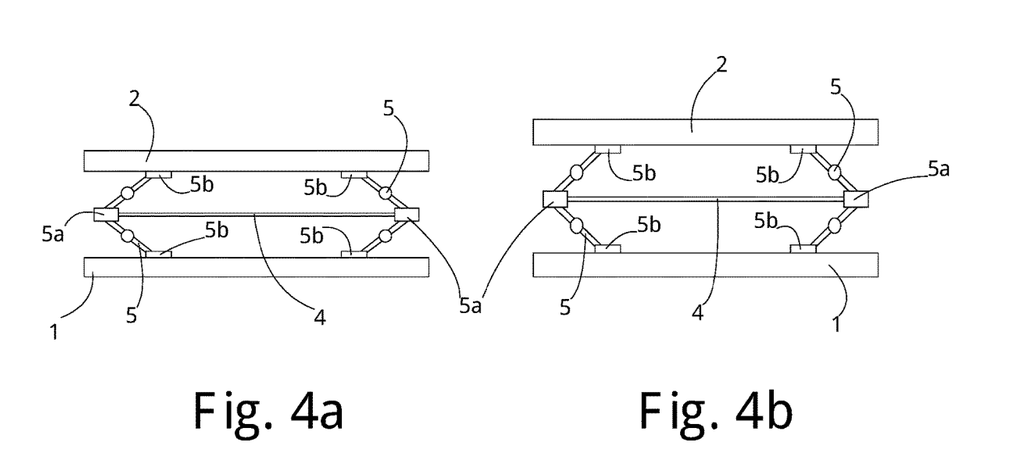
FIGS. 4a and 4b are schematic front views of a third embodiment of the AF actuator with the SMA wires in the non-activated and activated conditions respectively.

In the third embodiment schematically illustrated in FIGS. 4a, 4b the difference resides in the shape of the return elastic elements, in that each return elastic element 5 consists of a horizontal V-shaped flexible connector mounted with its vertex 5a at an outermost position with respect to its ends 5b, which are preferably connected to the support member 1 and to the lens carrier 2 at vertically aligned positions. Also, each shape memory alloy wire 4 is preferably mounted between the vertices 5a of the two horizontal V-shaped flexible connectors 5 of each pair, but it could also be mounted horizontally at a different height or it could be mounted slanted.

The operation of this third embodiment is substantially the same as in the previous embodiments, i.e. when the shape memory alloy wires 4 are heated by current passage they shorten and pull vertices 5a closer to each other thus widening the V shape of each horizontal V-shaped flexible connector 5 and causing the lens carrier 2 to move upwards through ends 5b (FIG. 4b). Upon deactivation of the SMA wires 4, the return elastic elements 5 pull back the lens carrier 2 to the rest position of FIG. 4a.

The exact shape and position of the two return elastic elements 5 of each pair is obviously variable according to the specific requirements of the actuator, in that the two elements 5 could be closer and/or the sides of their V shapes could be longer.

Figures 5A, 5B:
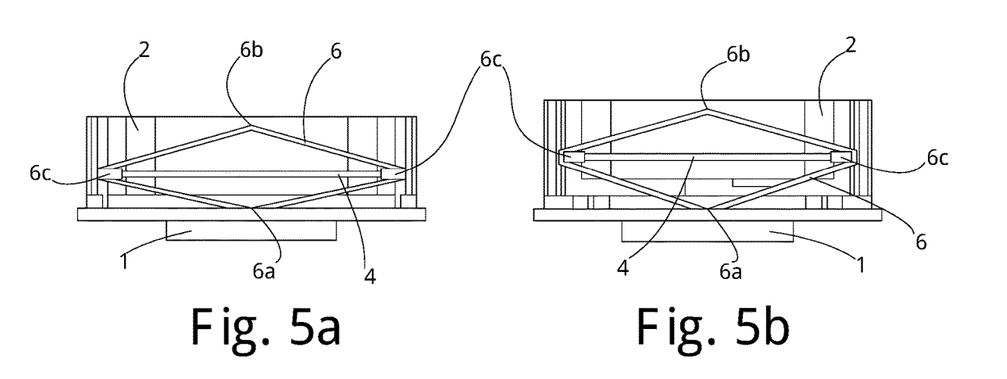
FIGS. 5a and 5b are front views of a fourth embodiment of the AF actuator with the SMA wires in the non-activated and activated conditions respectively.

In this respect, a variant of such an arrangement is shown in the fourth embodiment illustrated in FIGS. 5a, 5b where the ends 5b come into contact so that the two return elastic elements 5 of each pair are merged into a single rhomb-shaped elastic element 6. More specifically, this embodiment includes only two identical rhomb-shaped return elastic elements 6 mounted with a bottom vertex 6a secured to the support member 1 and vertically aligned to a top vertex 6b secured to the lens carrier 2, close to the top edge thereof, and two straight shape memory alloy wires 4 each of which is mounted within one of the rhomb-shaped return elastic elements 6, preferably between two horizontally aligned intermediate vertices 6c thereof (but it could also be mounted horizontally at a different height or it could be mounted slanted).

The operation of this fourth embodiment is substantially the same as in the third embodiment, i.e. when the shape memory alloy wires 4 are heated by current passage they shorten and pull vertices 6c closer to each other thus making narrower and higher the rhomb shape of each return elastic element 6 and causing the lens carrier 2 to move upwards through the top vertices 6b (FIG. 5b). Upon deactivation of the SMA wires 4, the return elastic elements 6 pull back the lens carrier 2 to the rest position of FIG. 5a.

Figure 6A:
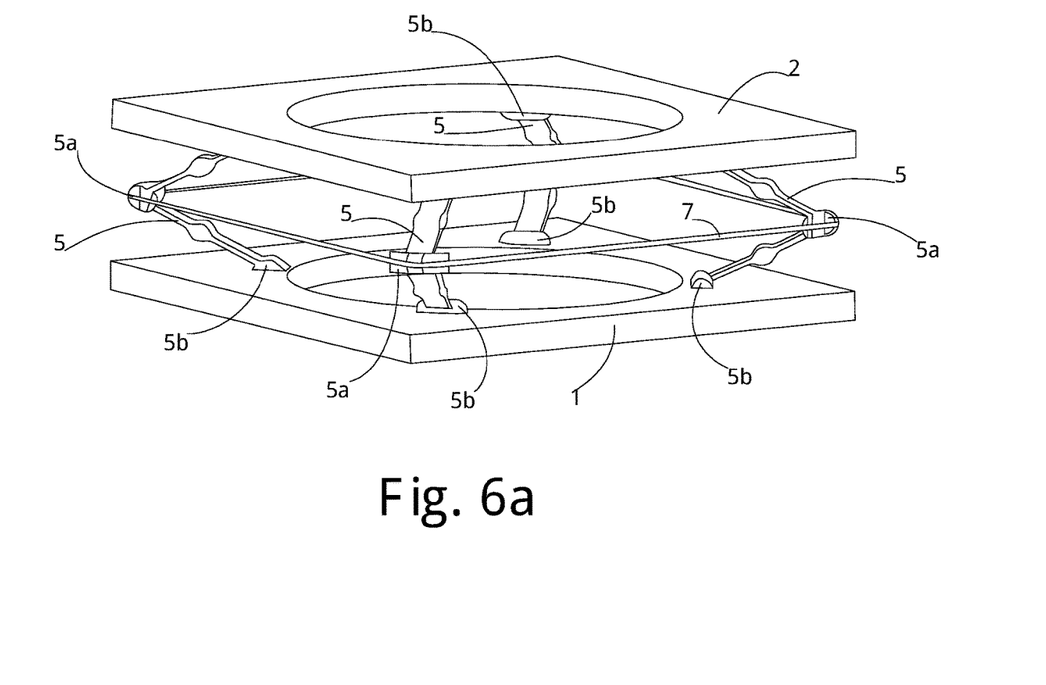
FIGS. 6a and 6b are schematic top perspective views of a fifth embodiment of the AF actuator with a single SMA wire in the non-activated and activated conditions respectively.
Figure 6B:
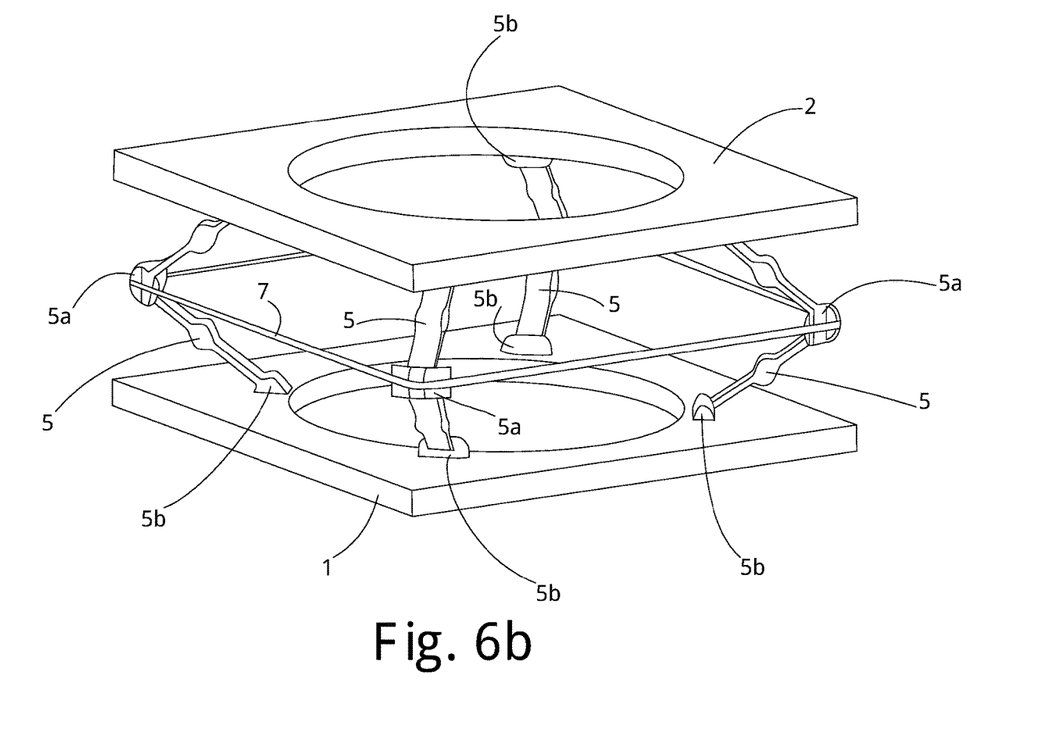

The same four horizontal V-shaped flexible connectors 5 that are used in the third embodiment as return elastic elements are also used in the fifth embodiment illustrated in FIGS. 6a, 6b but with a different arrangement. In fact, while in the third embodiment such connectors 5 were arranged in two pairs with the two elements of each pair being contained in a common plane parallel to the optical axis, in the fifth embodiment they are still arranged in two pairs with the two elements of each pair being contained in a common plane but said plane comprises the optical axis (i.e. the two common planes intersect in the optical axis).

Since the lens carrier (not shown) is located between the two elements 5 of each pair, in this case it is not possible to arrange a SMA wire between the vertices 5a of the two elements 5 of each pair whereby a single shape memory alloy wire 7 is horizontally mounted to sequentially connect the vertices 5a of all four elements 5 along the periphery of the actuator (but it could also be mounted horizontally at a different height).

Obviously, the operation of this fifth embodiment is substantially the same as in the third embodiment, i.e. when the shape memory alloy wire 7 is heated by current passage it shortens and pulls all four vertices 5a towards the optical axis making them closer to each other thus widening the V shape of each return elastic element 5 and causing the lens carrier 2 to move upwards through ends 5b (FIG. 6b). Upon deactivation of the SMA wire 7, the return elastic elements 5 pull back the lens carrier 2 to the rest position of FIG. 6a.

It is to be underlined that the above embodiment operates in a different way with respect to the solution described in the above-mentioned EP 2003489, where the SMA wire acts on the pantograph structure of the drive arm that does not provide any additional contribution as return force, that in such a solution is provided only by the overlying spring, and the SMA wire is bent around the unyielding tension guide such that the wire length reduction is transmitted only to the two opposite yielding displacement input sections.

Figure 7A:
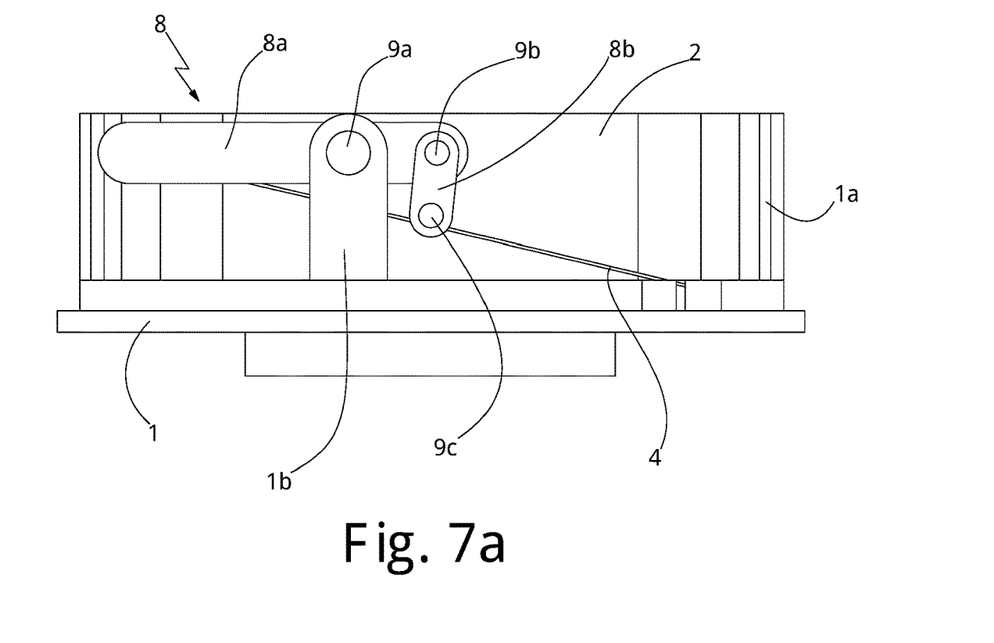
FIGS. 7a and 7b are front views of a sixth embodiment of the AF actuator with the SMA wires in the non-activated and activated conditions respectively.
Figure 7B:
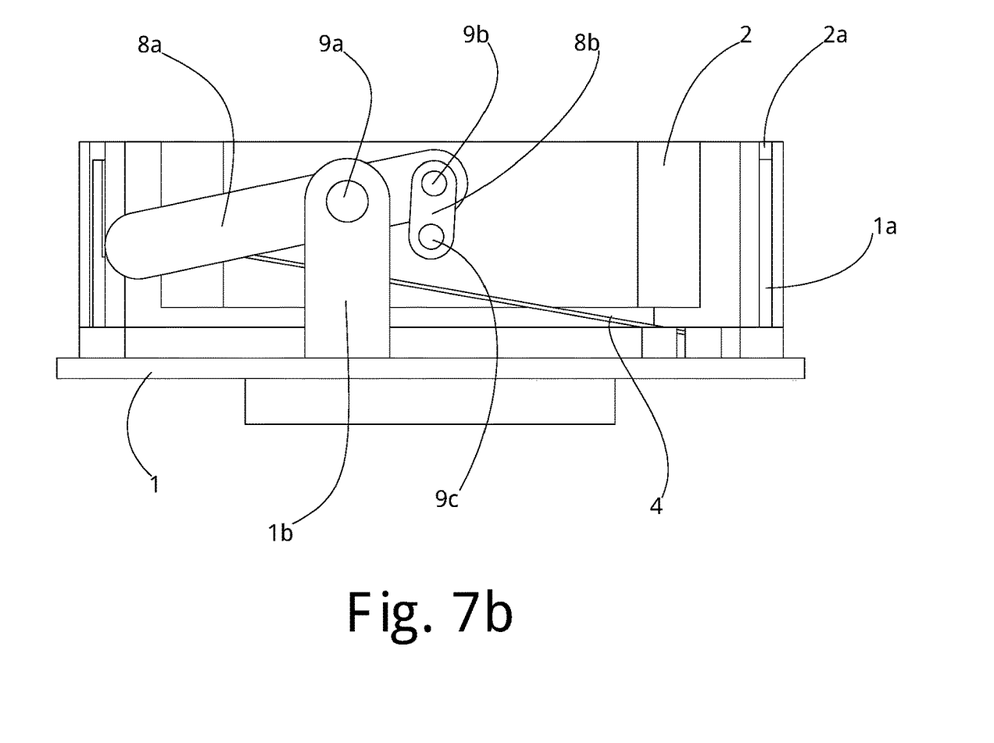

The sixth and last embodiment illustrated in FIGS. 7a, 7b is similar to the fourth embodiment in that it includes only two identical lever-rod return elastic elements 8, each of which includes a lever 8a pivoted on the support member 1 and carrying a rod 8b pivoted between said lever 8a and the lens carrier 2 at a central position of the latter, and two straight shape memory alloy wires 4 each of which is secured between the support member 1 and lever 8a. The pivoting connections 9a, 9b, 9c between these elements are realized through film hinges made out of plastic that also act as torsional springs, so as to provide a return force upon deactivation of the SMA wire 4.

In the illustrated embodiment, with reference to the rest position of FIG. 7a, lever 8a is pivoted substantially horizontally on the support member 1 through a first pivot 9a located at the top of an upright 1b extending on the left of the actuator's centre from the base of the support member 1 up to the top edge of the lens carrier 2. Furthermore, rod 8b is pivoted almost vertically between the right end of lever 8a, through a second pivot 9b, and a horizontally central portion of the lens carrier 2, through a third pivot 9c, while the SMA wire 4 is secured between the right corner of the support member 1, close to the base of post 1a, and the left end of lever 8a so as to maximize its extension.

In the light of the description above, the operation of this sixth embodiment is readily understood: when the shape memory alloy wire 4 is heated by current passage it shortens and pulls on the left end of lever 8a with a line of action that passes below the first pivot 9a thus causing a counter-clockwise rotation of lever 8a that moves the lens carrier 2 upwards through rod 8b that also makes a little counter-clockwise rotation around the third pivot 9c (FIG. 7b). Upon deactivation of the SMA wire 4, the return elastic elements 8 pull back the lens carrier 2 to the rest position of FIG. 7a through the action of the torsional springs in the three pivots 9a, 9b, 9c that cause a reverse rotation of lever 8a and rod 8b. Note that depending on the force of the torsional springs and on the amount of friction to be overcome in returning the lens carrier 2 to the rest position, only two or even only one torsional spring might be needed.

It should also be noted that lever 8a could be pivoted directly on the lens carrier 2 through the second pivot 9b, thus dispensing with rod 8b and the third pivot 9c, but since the rotation of lever 8a around the first pivot 9a will also result in a little horizontal shift of the secondo pivot 9b that would generate off-axis forces and torsional effects on the lens carrier 2, the presence of rod 8b is required to obtain a purely axial force of the return elastic elements 8.

In the light of the description above, it is clear that in all the embodiments of the present invention except the fifth embodiment the SMA wire(s) 4 has/have a very simple straight configuration that provides the maximum reliability and effectiveness, and even in the fifth embodiment the annular SMA wire 7 is bent around the yielding return elastic elements 5 that do not cause a stress concentration upon activation of the SMA wire.

The AF actuator according to the present invention is not restricted to a specific type of shape memory alloy wires, and any shape memory alloy wires activated by Joule effect may be usefully employed. Having said that, preferred is the use of shape memory alloy wires made with Ni—Ti alloys widely known in the field with the name of Nitinol, with diameters ranging from 10 µm to 200 µm (preferably from 30 µm to 75 µm) and commercially available from a variety of sources, for examples the wires sold under the trade name Smartflex by SAES Getters S.p.A.

As to the material of the V-shaped connectors 5 and rhomb-shaped connectors 6 used in the third to fifth embodiments, it is not restricted to any particular one provided that it has enough resistance to a high number of deformations when pulled by the SMA wire. Preferred materials are fiberglass reinforced plastics (FRP), i.e. a type of fiber-reinforced plastic where the reinforcement fiber is specifically glass fiber, most preferably with a Young's modulus comprised between 14 and 15 GPa.

The present AF actuator also preferably includes safety features that make it more reliable and resistant to mechanical failure by providing each shape memory alloy wire 4, preferably at one end thereof, with a spring (not shown) having such a stiffness that in the normal actuator operation it acts as a rigid connection member. However, said spring acts as a fail-safe member that provides an elongation sufficient to absorb the contraction of the shape memory alloy wire 4 in case the latter is forced to operate on a stuck lens carrier 2 that is unable to move. For example, if wire 4 can withstand a stress not much higher than 450 MPa the spring will be selected to have a starting stress level of 450 MPa to activate, whereas before this stress level it will not significantly elongate.

Note that a similar safety feature can also be applied to the single "annular" SMA wire 7 of the fifth embodiment by introducing therein an elastic portion that is connected by crimping to the SMA portion.

It is clear that the above-described and illustrated embodiments of the actuator according to the invention are just examples susceptible of various modifications. In particular, the exact shape and position of the sliding couplings between the support member 1, 1' and the lens carrier 2, 2' can be somewhat changed and the same applies to the elastic return elements 3, 5, 6 and 8 as long as the general symmetry of the structure is maintained.

The invention claimed is:

1. A camera module autofocus actuator comprising:
a fixed support member (1; 1'),
a movable lens carrier (2; 2') slidingly received on said fixed support member (1; 1') so as to move along an optical axis (A),
one or more shape memory alloy wires (4; 7) arranged to be activated so as to cause said movable lens carrier (2; 2') to move along said optical axis (A) in a first direction,
a first return elastic element (3; 5; 6; 8) mounted between the support member (1; 1') and the lens carrier (2; 2') so as to exert a return force only in parallel to the optical axis (A) in a second direction opposite to said first direction determined by the activation of said one or more shape memory alloy wires (4; 7),
at least a second return elastic element (3; 5; 6; 8) substantially identical to and mounted in the same way as said first return elastic element (3; 5; 6; 8), said return elastic elements (3; 5; 6; 8) being arranged at symmetrically opposite positions with respect to the optical axis (A),
said actuator being characterized in that
each of the one or more shape memory alloy wires (4; 7) is mounted with a first end directly secured mechanically without any interposed element to one of the return elastic elements (3; 5; 6; 8) and a second end directly secured mechanically without any interposed element to any of the same return elastic element (3; 5; 6; 8) to which said first end is secured, or
another return elastic element (3; 5; 6; 8), or
the support member (1; 1'),
so as to cause said movement of the lens carrier (2; 2') in the first direction through a mechanical action of the return elastic elements (3; 5; 6; 8) resulting from a deformation thereof upon activation of the one or more shape memory alloy wires (4; 7).

2. The camera module autofocus actuator according to claim 1, wherein the fixed support member (1; 1') and the movable lens carrier (2; 2') have a substantially square or rectangular shape in a plane orthogonal to the optical axis (A), and they are slidingly coupled through at least four guide posts (1a; 1a') extending parallel to the optical axis (A), preferably formed at the corners on the support member (1; 1'), that engage matching grooves (2a; 2a'), preferably formed on the lens carrier (2; 2'), with dimensional tolerances that guarantee a maximum tilt of 0.08° and no rolling members arranged between the support member (1; 1') and the lens carrier (2; 2').

3. The camera module autofocus actuator according to claim 2, wherein the support member (1; 1') is made from polybutylene terephthalate and the lens carrier (2; 2') is made from copolymer polyoxymethylene, with the guide posts (1a; 1a') being optionally made of metal.

4. The camera module autofocus actuator according to claim 3, wherein it includes four identical return elastic elements (3; 5) arranged in two pairs, with the two elements (3; 5) of each pair being contained in a common plane parallel to the optical axis (A) with symmetrically opposite mounting arrangements with respect to the optical axis (A), and two straight shape memory alloy wires (4) each of which is mounted, preferably horizontally, between the two elements (3; 5) of a same pair.

5. The camera module autofocus actuator according to claim 3, wherein it includes two identical rhomb-shaped return elastic elements (6), mounted with a bottom vertex (6a) secured to the support member (1; 1') and vertically aligned to a top vertex (6b) secured to the lens carrier (2; 2'), and two straight shape memory alloy wires (4) each of which is mounted within one of said rhomb-shaped return elastic elements (6), preferably between two horizontally aligned intermediate vertices (6c) thereof.

6. The camera module autofocus actuator according to claim 2, wherein it includes four identical return elastic elements (3; 5) arranged in two pairs, with the two elements (3; 5) of each pair being contained in a common plane parallel to the optical axis (A) with symmetrically opposite mounting arrangements with respect to the optical axis (A), and two straight shape memory alloy wires (4) each of which is mounted, preferably horizontally, between the two elements (3; 5) of a same pair.

7. The camera module autofocus actuator according to claim 2, wherein it includes two identical rhomb-shaped return elastic elements (6), mounted with a bottom vertex (6a) secured to the support member (1; 1') and vertically aligned to a top vertex (6b) secured to the lens carrier (2; 2'), and two straight shape memory alloy wires (4) each of which is mounted within one of said rhomb-shaped return elastic elements (6), preferably between two horizontally aligned intermediate vertices (6c) thereof.

8. The camera module autofocus actuator according to claim 2, wherein it includes four identical return elastic elements consisting of horizontal V-shaped flexible connectors (5) mounted with their vertices (5a) at an outermost position with respect to their ends (5b), said four identical return elastic elements being arranged in two pairs with the two elements of each pair being contained in a common plane comprising the optical axis (A) with symmetrically opposite mounting arrangements with respect to the optical axis (A), and a single shape memory alloy wire (7) which is horizontally mounted to sequentially connect all four identical return elastic elements along the periphery of the actuator.

9. The camera module autofocus actuator according to claim 1, wherein it includes four identical return elastic elements (3; 5) arranged in two pairs, with the two elements (3; 5) of each pair being contained in a common plane parallel to the optical axis (A) with symmetrically opposite mounting arrangements with respect to the optical axis (A), and two straight shape memory alloy wires (4) each of which is mounted, preferably horizontally, between the two elements (3; 5) of a same pair.

10. The camera module autofocus actuator according to claim 9, wherein each return elastic element (3) includes a flexible strip preferably made of metal, mounted with a first end (3a) secured to the support member (1; 1') at a lower outermost position and a second end (3b) secured to the lens carrier (2; 2') at a higher innermost position.

11. The camera module autofocus actuator according to claim 10, wherein each return elastic element (3) further includes an upright (3c) extending substantially vertically from the mounting position of the first end (3a) of the strip up to at least the height at which the mounting position of the second end (3b) of the strip is located when the shape memory alloy wire (4) is not activated, the latter being mounted between said uprights (3c) substantially at said height.

12. The camera module autofocus actuator according to claim 9, wherein each return elastic element consists of a horizontal V-shaped flexible connector (5) mounted with its vertex (5a) at an outermost position with respect to its ends (5b).

13. The camera module autofocus actuator according to claim 12, wherein the ends (5b) of each horizontal V-shaped flexible connector (5) are respectively connected to the support member (1; 1') and to the lens carrier (2; 2') at vertically aligned positions, and in that each shape memory alloy wire (4) is mounted between the vertices (5a) of the two horizontal V-shaped flexible connectors (5) of each pair.

14. The camera module autofocus actuator according to claim 1, wherein it includes two identical rhomb-shaped return elastic elements (6), mounted with a bottom vertex (6a) secured to the support member (1; 1') and vertically aligned to a top vertex (6b) secured to the lens carrier (2; 2'), and two straight shape memory alloy wires (4) each of which is mounted within one of said rhomb-shaped return elastic elements (6), preferably between two horizontally aligned intermediate vertices (6c) thereof.

15. The camera module autofocus actuator according to claim 1, wherein it includes four identical return elastic elements consisting of horizontal V-shaped flexible connectors (5) mounted with their vertices (5a) at an outermost position with respect to their ends (5b), said four identical return elastic elements being arranged in two pairs with the two elements of each pair being contained in a common plane comprising the optical axis (A) with symmetrically opposite mounting arrangements with respect to the optical axis (A), and a single shape memory alloy wire (7) which is horizontally mounted to sequentially connect all four identical return elastic elements along the periphery of the actuator.

16. The camera module autofocus actuator according to claim 15, wherein the ends (5b) of each horizontal V-shaped flexible connector (5) are respectively connected to the support member (1; 1') and to the lens carrier (2; 2') at vertically aligned positions, and in that the shape memory alloy wire (7) is mounted between the vertices (5a) of the four horizontal V-shaped flexible connectors (5).

17. The camera module autofocus actuator according to claim 1, wherein it includes two identical lever-rod return elastic elements (8) each of which includes a lever (8a) pivoted (9a) on the support member (1; 1') and carrying a rod (8b) pivoted (9b, 9c) between said lever (8a) and the lens carrier (2; 2') at a horizontally central position of the latter, and a shape memory alloy wire (4) secured between the support member (1; 1') and the lever (8a), the pivoting connections (9a, 9b, 9c) between these elements (1, 2, 8a, 8b) being realized through film hinges made out of plastic such that at least one of them also acts as a torsional spring.

18. The camera module autofocus actuator according to claim 17, wherein, when the actuator is in the rest position, the lever (8a) is pivoted substantially horizontally on the support member (1; 1') through a pivot (9a) located at the top of an upright (1b) extending on a first side with respect to the actuator's centre from the base of the support member (1; 1') up to the top edge of the lens carrier (2; 2'), while the rod (8b) is pivoted almost vertically between a horizontally central portion of the lens carrier (2; 2') and the end of the lever (8a) that is located on a second side that is opposite to said first side with respect to said pivot (9a), and the shape memory alloy wire (4) is secured between the corner of the support member (1; 1') that is on said second side and the end of the lever (5a) that is on said first side with respect to the pivot (9a), the shape memory alloy wire (4) passing below the pivot (9a).

19. The camera module autofocus actuator according to claim 1, wherein each of the one or more shape memory alloy wires (4; 7) includes, preferably at one end thereof, a spring having such a stiffness that in the normal actuator operation it acts as a rigid connection member, whereas said spring acts as a fail-safe member that provides an elongation sufficient to absorb the contraction of the shape memory alloy wire (4; 7) in case the latter is forced to operate on a stuck lens carrier (2; 2') that is unable to move.

20. The camera module autofocus actuator according to claim 1, wherein the elastic return elements (3; 5; 6; 8) are made of fiberglass reinforced plastic, preferably with a Young's modulus comprised between 14 and 15 GPa.

* * * * *